United States Patent
Kremer

(10) Patent No.: US 9,957,032 B2
(45) Date of Patent: May 1, 2018

(54) FIBRE COMPOSITE COMPONENT, WINGLET AND AIRCRAFT WITH A FIBRE COMPOSITE COMPONENT

(71) Applicant: Airbus Operations GmbH, Hamburg (DE)

(72) Inventor: Tobias Kremer, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1085 days.

(21) Appl. No.: 14/054,875

(22) Filed: Oct. 16, 2013

(65) Prior Publication Data

US 2014/0113107 A1    Apr. 24, 2014

Related U.S. Application Data

(63) Continuation of application No. PCT/EP2012/057028, filed on Apr. 18, 2012.
(Continued)

(30) Foreign Application Priority Data

Apr. 20, 2011    (DE) .................. 10 2011 017 460

(51) Int. Cl.
*B64C 1/14*    (2006.01)
*B64C 3/18*    (2006.01)
(Continued)

(52) U.S. Cl.
CPC .............. *B64C 1/14* (2013.01); *B64C 1/06* (2013.01); *B64C 1/12* (2013.01); *B64C 3/18* (2013.01); *Y10T 428/2419* (2015.01)

(58) Field of Classification Search
CPC .... B64C 3/18; B64C 1/06; B64C 1/12; B64C 1/14; Y10T 428/2419
(Continued)

(56) References Cited

U.S. PATENT DOCUMENTS 5,407,153 A    4/1995    Kirk et al.
6,638,466 B1    10/2003    Abbott
(Continued)

FOREIGN PATENT DOCUMENTS

DE         10145276 A1    7/2003
DE    102004012374 A1    10/2005

OTHER PUBLICATIONS

Peoples Republic of China, Chinese Office Action for Chinese Patent Application No. 201280019245.8 dated Aug. 5, 2015.
(Continued)

*Primary Examiner* — Brian Handville
(74) *Attorney, Agent, or Firm* — Lorenz & Kopf, LLP

(57) ABSTRACT

A fiber composite component made of a fiber composite material comprises at least one first surface section, at least one second surface section and at least one transition region. The first surface section and the second surface section are arranged at an angle to each other and incorporate the transition region. The transition region comprises at least one first curvature section and at least one second curvature section whose mean curvatures differ from each other, which curvature sections connect to each other in a tangentially continuous manner. The first surface section connects to the transition region, and the transition region connects to the second surface section in each case in a tangentially continuous manner. In one example, the radius of curvature of the first curvature section is smaller than that of the second curvature section.

20 Claims, 5 Drawing Sheets

Related U.S. Application Data

(60) Provisional application No. 61/477,494, filed on Apr. 20, 2011.

(51) Int. Cl.
*B64C 1/06* (2006.01)
*B64C 1/12* (2006.01)

(58) Field of Classification Search
USPC .......................................................... 428/121
See application file for complete search history.

(56) References Cited

U.S. PATENT DOCUMENTS

| | | |
|---|---|---|
| 2008/0073931 A1 | 3/2008 | Mahieu et al. |
| 2008/0290214 A1 | 11/2008 | Guzman et al. |
| 2010/0019094 A1 | 1/2010 | Theurich et al. |
| 2011/0017870 A1* | 1/2011 | Gallant .................. B64C 1/061 244/129.3 |
| 2011/0024563 A1 | 2/2011 | Bauer et al. |
| 2012/0049010 A1 | 3/2012 | Speer |

OTHER PUBLICATIONS

German Patent Office, Office Action for 102011017460.5 dated Mar. 13, 2012.

Schurmann, Helmet, "Konstruieren mit Faser-Kunststoff-Verbunden", 2nd edition, Springer, 2007, pp. 620-621, ISBN 978-3-540-72189-5.

International Searching Authority, International Search Report for PCT/EP2012/057028 dated Dec. 10, 2012.

Peoples Republic of China, Chinese Office Action for Chinese Patent Application No. 201280019245.8 dated Jan. 19, 2016.

* cited by examiner

FIBRE COMPOSITE COMPONENT, WINGLET AND AIRCRAFT WITH A FIBRE COMPOSITE COMPONENT

CROSS-REFERENCE TO RELATED APPLICATIONS

This is a continuation of International Application No. PCT/EP2012/057028, filed Apr. 18, 2012, which claims priority to German Patent Application No. 10 2011 017 460.5, filed Apr. 20, 2011, and to U.S. Provisional Patent Application No. 61/477,494, filed Apr. 20, 2011, which are each incorporated herein by reference in their entirety.

TECHNICAL FIELD

This application pertains to a fiber composite component, to a winglet with a stiffening component and a shell, and to an aircraft with a fiber composite component.

BACKGROUND

The use of fiber composite components is interesting in many fields of application, above all because of the particularly high specific strength it provides. Such components are made from a laminate comprising fiber layers that are embedded in a matrix material. In order to achieve particularly high strength, the fibers of the individual fiber layers can be aligned in a load-dependent manner. After a layered composition of the fiber composite component, curing of the matrix material takes place under the influence of heat, and if applicable also pressure. The fact that any desired component shapes can be implemented by means of a fiber composite material is particularly advantageous.

Because of the usually directed fibers and due to the layered structure, fiber composite components have non-isotropic materials characteristics. In particular in the case of curved fiber composite components with two surface sections that are arranged at an angle to each other and a transition region situated between them, a strong coupling of flexural stress and tension in the direction of thickness can be detected. Loading the fiber composite component by a tensile force, transverse force or a moment results in the component being stretched in the transition region and additionally being bent against its direction of curvature. This results in so-called interlaminar unfolding stress with radial components of the flexural stress which because of the curvature no longer acts in a line. This unfolding stress may result in individual layers within the laminate of the fiber composite component becoming irreversibly detached from each other in the transition region.

In the state of the art, these phenomena are reduced by locally thickened regions and in particular by the application of additional local laminate layers. From the point of view of production engineering, this is too expensive, in particular in the case of smaller fiber composite components, so that in order to achieve the failure load that is required in terms of design, the entire profile would have to be thickened. In particular in the case of use within an aircraft, this results, however, in an undesirable increase in weight.

Other objects, desirable features and characteristics will become apparent from the subsequent summary and detailed description, and the appended claims, taken in conjunction with the accompanying drawings and this background.

SUMMARY

According to various teachings of the present disclosure, provided is a fiber composite component with surface sections that are arranged at an angle to each other, a transition region situated in-between, and a method for producing a fiber composite component in which unfolding stress in the transition region can be reduced without excessively thickening the profile of the component.

In one example, a fiber composite component according to the present disclosure comprises at least one first surface section and at least one second surface section that are arranged at an angle to each other and incorporate a transition region. In this document the term "angular arrangement" refers to the surface sections extending in different planes that are at an angle other than zero to each other. The transition region comprises at least one first curvature section and at least one second curvature section whose mean curvatures differ from each other and connect to each other in a tangentially continuous manner, wherein the first surface section connects to the transition region and the transition region connects to the second surface section in each case in a tangentially continuous manner.

Planar and curved components differ from each other in that a flexural load results in stress in the direction of thickness in the form of unfolding stress $\sigma_r$. With little load a smaller radius would result in greater stress in the direction of thickness than a larger radius. In fiber composite components with surface sections that are arranged at an angle to each other, the loads in the form of a moment, a transverse force or a normal force change in different locations. Consequently the stress, i.e. the unfolding stress, also changes in different locations.

Failure due to unfolding is thus predominantly driven as a result of the curvature as a reciprocal value of the radius of curvature. A stronger curvature is responsible for earlier failure than a lesser curvature. In the construction of fiber composite components with a first surface section and a second surface section arranged at an angle to it a radius of curvature cannot be increased at will, because normally there is only limited space available for the fiber composite component. Such restrictions can be in the form of concrete positions of connecting means such as rivets, bolts or the like in the surface sections; however, they can also be predetermined by the extension of adjacently positioned fiber composite components or other bodies.

With the use of at least two curvature sections in a transition region between the surface sections that are arranged at an angle to each other, a relatively short curvature section, which may directly follow on from a surface section, with a relatively strong curvature (hereinafter referred to as the "first curvature section") can create a tangentially continuous transition to a significantly less curved curvature section (hereinafter referred to as the "second curvature section"), with the aforesaid in one embodiment generally extending to the other surface section, which is arranged at an angle to it, and forming a tangentially continuous transition. By way of this less curved region the unfolding stress is clearly reduced when compared to the possibilities provided by a constant but stronger curvature between the first and the second surface section. It can thus be considered an aspect of the present disclosure to provide a less curved region which follows on from at least one relatively short strongly curved section, which serves as a curvature commencement section, on the first surface section.

In one example, the curvature sections comprise a circular curvature with a constant radius of curvature. The curvature is referred to as the "mean curvature" so as to take into account manufacturing inaccuracies.

In another example, in the case of the use of a single more strongly curved curvature section, the aforesaid should be arranged at such a position of the fiber composite component at which in use usually the least-possible flexural moment is experienced. If, for example, the second surface section is subjected to a normal force, it would make sense to arrange the more strongly curved first curvature section on the second surface section, and to arrange the less curved second curvature section directly on the first surface section. The greatest flexural moment caused by the normal force would then only be located in the curvature section with the lesser curvature, and consequently the unfolding stress would be significantly reduced with design space requirements that are unchanged when compared to the state of the art.

The location of the second curvature section, which has less of a curvature, should be positioned in the fiber composite component according to the present disclosure in that location where the greatest load occurs. This location can be determined by experimental trials, by means of an FEM analysis or by analytical calculation. Because of a generally constant thickness of the laminate of the fiber composite component according to the present disclosure, the location of highest load determines the minimum radius of curvature necessary to provide an adequate failure load. Subsequently, towards the outside, the first curvature section can follow on from this second curvature section that is equipped in this manner; optionally, two first curvature sections that implement a tangentially continuous transition to the first or to the second surface section with a stronger curvature.

In one exemplary embodiment of the present disclosure, the transition region comprises two first curvature sections that incorporate a second curvature section in a tangentially continuous manner and that are connected to the first surface section and the second surface section in a tangentially continuous manner. In this manner on both ends of the entire transition region over a comparatively short distance a connection angle is determined from which the second curvature section can follow, in each case in a tangentially continuous manner. Such a fiber composite component may comprise the same advantageous unfolding behavior with low unfolding stress with all loads on the surface sections, and in this manner may be used more universally. It should be pointed out that the two first curvature sections do not necessarily need to have an identical radius of curvature; instead, they can differ slightly from each other, for example if the available design space imposes limitations relating to the manufacturing technology, or other limitations.

In this context it should be mentioned that advantageously the first curvature section should have the smallest possible radius of curvature from the point of view of manufacturing technology, while the second curvature section should comprise the largest possible radius of curvature from the point of view of design space restrictions. The smallest possible curvature may be determined experimentally taking into account a common safety factor, and/or by prior manufacturing trials; said curvature corresponds approximately or largely to a minimum radius of curvature of the fibers used in the fiber composite material. The latter may include any type of fibers. In particular in relation to an aircraft, carbon fibers, glass fibers and Kevlar are mentioned.

In one embodiment of the present disclosure the radius of curvature of the second curvature section is at least twice as large as the radius of curvature of the first curvature section. In this manner it is already possible to achieve a significant reduction of unfolding stress within the fiber composite component according to the present disclosure.

In one exemplary embodiment the radius of curvature of the second curvature section is at least five times as large as the radius of curvature of the first curvature section. During manufacture of the fiber composite component according to the present disclosure the radius of curvature of the first curvature section then needs to be selected in such a manner that a tangentially continuous transition of the first surface section by way of the transition region from at least one first curvature region and at least one second curvature region to the second surface section is made possible. As a result of this clear difference between the radius of curvature of the first curvature section and of the second curvature section a relatively short commencement with a strong curvature can provide a connection angle at which a second curvature section with a slight curvature can follow on. The most pronounced part of the transition region thus, as a result of the lesser curvature, causes considerably lesser unfolding stress so that a comparatively thin profile thickness can be tolerated, and in particular with the use of such a fiber composite component in an aircraft an advantageously light weight is achieved.

For the same reason it is particularly advantageous if the radius of curvature of the second curvature section is at least ten times as large as the radius of curvature of the first curvature section.

In one embodiment the fiber composite component is an angle piece with at least one fastening means, for example a mounting hole, in the first surface section and at least one fastening means in the second surface section. Such an angle piece can be used to fasten a first fiber composite component to a second fiber composite component. In aircraft engineering this may, for example, provide the option of arranging stiffening components on a fuselage wall produced from a fiber composite material. The occurring unfolding stress may be reduced by the design according to the present disclosure to such an extent that the angle piece is of particularly lightweight construction.

In one exemplary embodiment of the present disclosure the fiber composite component comprises a third surface section and at least one second transition region, wherein the second transition region also comprises at least one first curvature section and at least one second curvature section with the characteristics discussed above. Consequently, more complex components may be fastened to each other and may in all transition regions result in advantageous unfolding behavior. In this manner weight savings may be achieved in particular in the construction of introduction elements in the form of shear ties, clips or angle pieces, which overall are used to transfer radial loads between components. Likewise it makes sense in the construction of window frames comprising a fiber composite material with a flange, a mounting surface arranged at an angle thereto, and a transition region situated in between, to design the latter in this manner.

In one embodiment the fiber composite component can be designed as a stiffening component in the form of an integral frame element that can be connected to a wall of a vehicle body and that on at least one first surface section comprises fastening means for fastening to a body wall of a vehicle, from which the second surface section extends, and from which a frame element collar follows. Between the first surface section and the second surface section there is a transition region, which is constructed according to the present disclosure. Between the second surface section and the frame element collar, likewise a transition region constructed according to the present disclosure is arranged. This design makes it possible to achieve a weight-saving construction of a closed body with at least one such frame element. This design makes sense, in particular, in the case of flow bodies that are arranged on an aircraft. For example, such a flow body may be a winglet, a sharklet or the like. In addition to the aforesaid, high-lift components, control surfaces, stabilizers, wing fuselage transition fairings or the like can be considered.

Furthermore, the various teachings of the present disclosure also relates to a winglet with a stiffening component and a shell, wherein the stiffening component comprises a first surface section and a second surface section that are arranged at an angle to each other and incorporate a transition region. The transition region comprises at least one first curvature section and at least one second curvature section whose mean curvatures differ from each other, and which curvature sections connect to each other in a tangentially continuous manner, wherein the first surface section connects to the transition region and the transition region connects to the second surface section, in each case in a tangentially continuous manner.

This design is of particular interest because the structure of such a winglet is curved so that, in the case of deflection of the winglet, unfolding stress between opposite sections of the shell occurs, which unfolding stress is removed by way of stiffening components arranged therein. Consequently, the stiffening component in the winglet is subject to unfolding. As a result of the design of the stiffening component with two different radii of curvature that connect to each other so that the unfolding stress largely arises only in the case of a relatively large radius of curvature, a significantly greater load of the winglet can be taken with limited design space.

With this construction of a winglet it also makes sense to arrange three curvature sections in the transition region, wherein the first curvature sections, which follow on directly from the individual surface sections, are very strongly curved while the second curvature section, which is enclosed by these strongly curved curvature sections is curved less pronouncedly.

A method for producing a fiber composite component according to the present disclosure comprises the laying of fibers in a positive mold or negative mold, and the application of matrix material, wherein in one example, several fiber layers are laid successively and are subjected to the matrix material. This is followed by drying.

The mold necessary for laying is generally manufactured in a machine milling procedure that makes it possible, in particular, to achieve greater freedom of shape that also includes transition regions with different radii.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
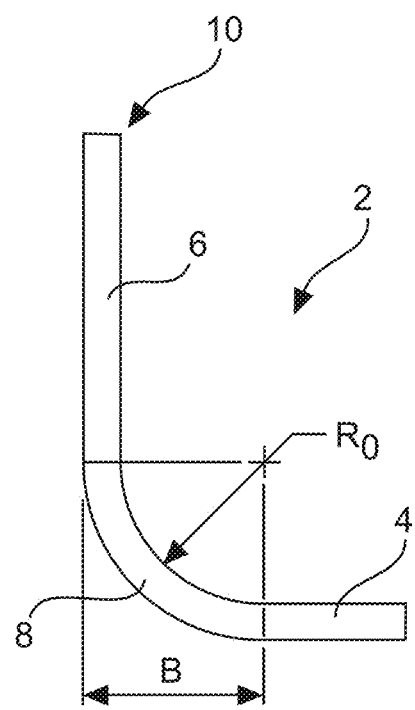
FIGS. 1A and 1B show a diagrammatic view of a fiber composite component according to the state of the art (FIG. 1A) and according to various embodiments of the present disclosure (FIG. 1B).

FIG. 1A is a simplified diagrammatic view of a fiber composite component 2 according to the state of the art, comprising a first surface section 4 and a second surface section 6, arranged at an angle to the aforesaid, between which surface sections 4, 6 a transition region 8 is arranged. The direction of the fibers is indicated by lines in the end regions. In the exemplary embodiment the first surface section 4 and the second surface section 6 are arranged so as to be largely perpendicular to each other, and the transition region 8 comprises a curvature with a radius of curvature $R_0$ that is constant. The transition region 8 thus forms a quarter circle.

During loading of an upper end 10 of the fiber composite component 2 with forces $F_1$ and $F_2$, which are shown as examples, in the transition region 8, strong so-called "unfolding stress" can result, as a result of which unfolding stress, layers of a fiber-matrix composite material of the transition region 8 can separate from each other. This results in irreversible damage to the material. In the worst case this may lead to complete structural failure so that the component would have to be replaced.

Figure 1B:
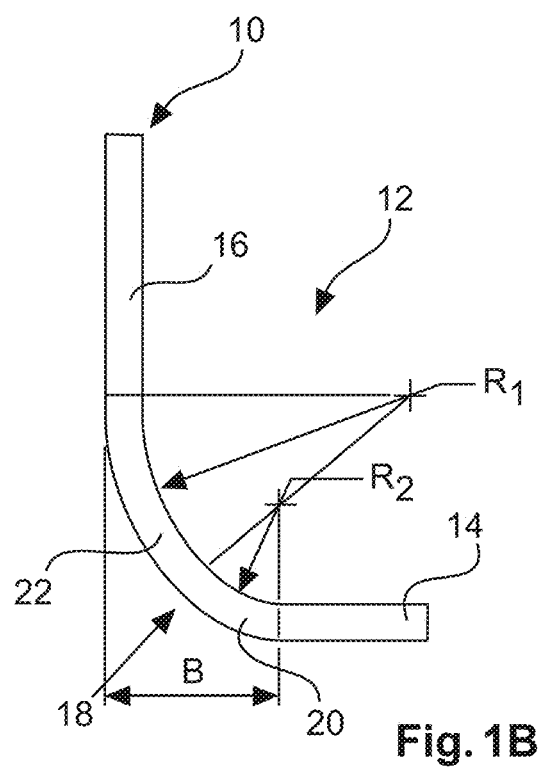

According to the various teachings of the present disclosure, a fiber composite component 12 according to FIG. 1B is proposed that also comprises a first surface section 14 and a second surface section 16, with a transition region 18 extending between them. The special nature of the fiber composite component 12 according to the present disclosure is due to the transition region 18 comprising a first curvature section 20 and a second curvature section 22, which curvature sections 20, 22 comprise different curvatures. The first curvature section 20 is curved at a radius $R_2$ that is significantly smaller than the radius $R_1$ at which the second curvature section 22 is curved.

Generally-speaking it has been observed that as a radius of curvature increases, the resulting unfolding stress is significantly lower. Since $R_1$ from the illustration in FIG. 1B is already significantly larger than $R_0$ of FIG. 1A, in the most highly-loaded second curvature section 22 significantly lower unfolding stress may be expected than in the transition region 8 of FIG. 1A.

To avoid additional loading as a result of buckling, cross-sectional cracks or the like it is necessary to achieve a tangentially continuous transition of the first surface section 14 to the first curvature section 20, from there to the second curvature section 22 and thereafter to the second surface section 16. As a result of this the force progression is very harmonic. Since $R_1$ should be selected to be as large as possible, while $R_2$ should be selected to be as small as possible, from the demand of a predetermined distance B between the first surface section 14 and the second surface section 16 an unequivocal geometric correlation between $R_1$ and an angle of extension $\alpha$, $R_2$ and an angle of extension $\beta$ and the width B results. In one example, the ratio of $R_1$ to $R_2$ is large. This means that $R_1$ should, for example, be at least twice as large as $R_2$, so that the most highly loaded second curvature section 22, because of the comparatively slight curvature is only subjected to little unfolding stress and thus experiences a lower failure tendency than does the transition region of FIG. 1A.

The design principle according to the various teachings of the present disclosure can at will be extended to any fiber composite components that comprise a curvature, which fiber composite components are mentioned below as examples.

Figure 2A:
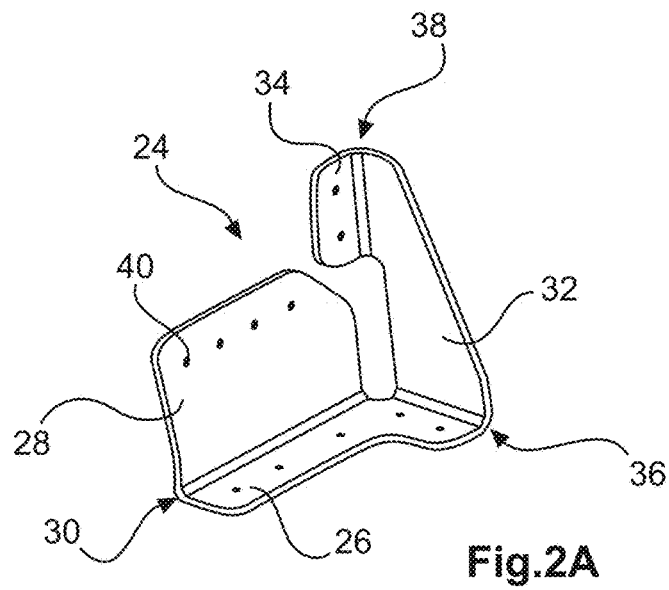
FIG. 2A shows a three-dimensional view of an angle piece as a fiber composite component according to various embodiments.

Thus, for example, FIG. 2A shows an angle piece 24 that comprises a first surface section 26, a second surface section 28 and a transition region 30 that may be designed as shown in FIG. 1B. The illustration further shows that the angle piece 24 comprises an angle 32 as a third surface section and a further second surface section 34, wherein both between the first surface section 26 and the third surface section 32 or angle a transition region 36 is arranged, and between the third surface section 32 and the additional second surface section 34 a transition region 38 is positioned, wherein all the transition regions 30, 36 and 38 are designed as shown in FIG. 1B in order to provide the highest possible failure load.

In the example of FIG. 2A the first surface section 28, the second surface section 26 and the fourth surface section 34 in each case form a mounting flange with fastening means 40 in the form of holes, for example for bolts or rivets. In contrast to the above, the third surface section 32 is a stay or support in order to increase the area moment of inertia in a plane that is substantially perpendicular to the first surface section 28.

Figure 2B:
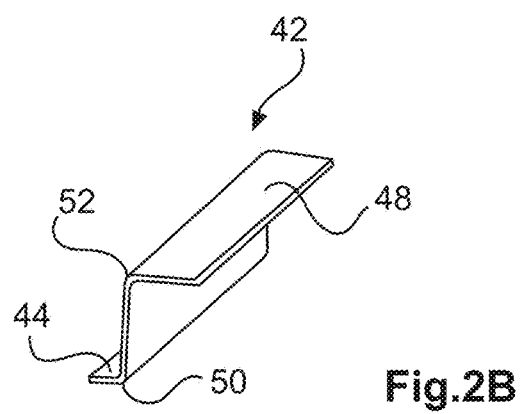
FIG. 2B shows a fiber composite component in the form of a stiffening component.

In particular in an aircraft it makes sense to manufacture stiffening components that stiffen a fuselage wall also from a fiber composite material. FIG. 2B shows such a stiffening component 42 in the form of a fiber composite component according to the present disclosure, which comprises a first surface section 44, a second surface section 46 and a third surface section 48, wherein the first surface section 44 and the second surface section 46 incorporate a transition region 50, and the second surface section 46 and the third surface section 48 incorporate a further transition region 52. The transition regions 50 and 52 are to be designed in such a manner that in as load-dependent as possible a manner there is a particularly slight curvature in the most highly loaded cross section in order to produce a greater failure load.

Figure 2C:
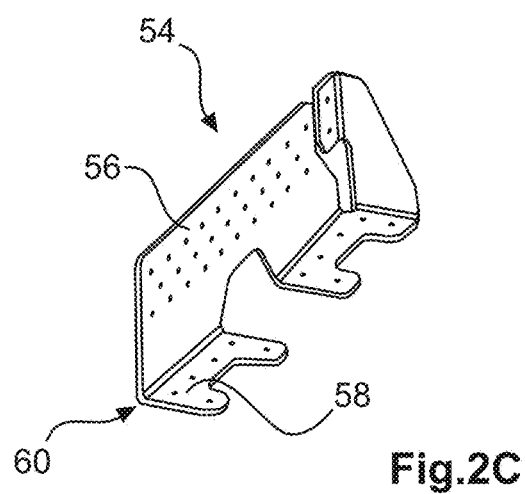
FIG. 2C shows an extended angle piece as a fiber composite component.

FIG. 2C shows, as an example, an expansion of an angle piece 24 of FIG. 2A in the form of an angle piece 54 with an extended first surface section 28 in the form of a first surface section 56 and a fifth surface section 58, arranged on the aforesaid, wherein the fifth surface section 58 encloses a transition region 60 with the first surface section 56, which transition region is also designed according to the various aspects of the present disclosure.

Figure 2D:
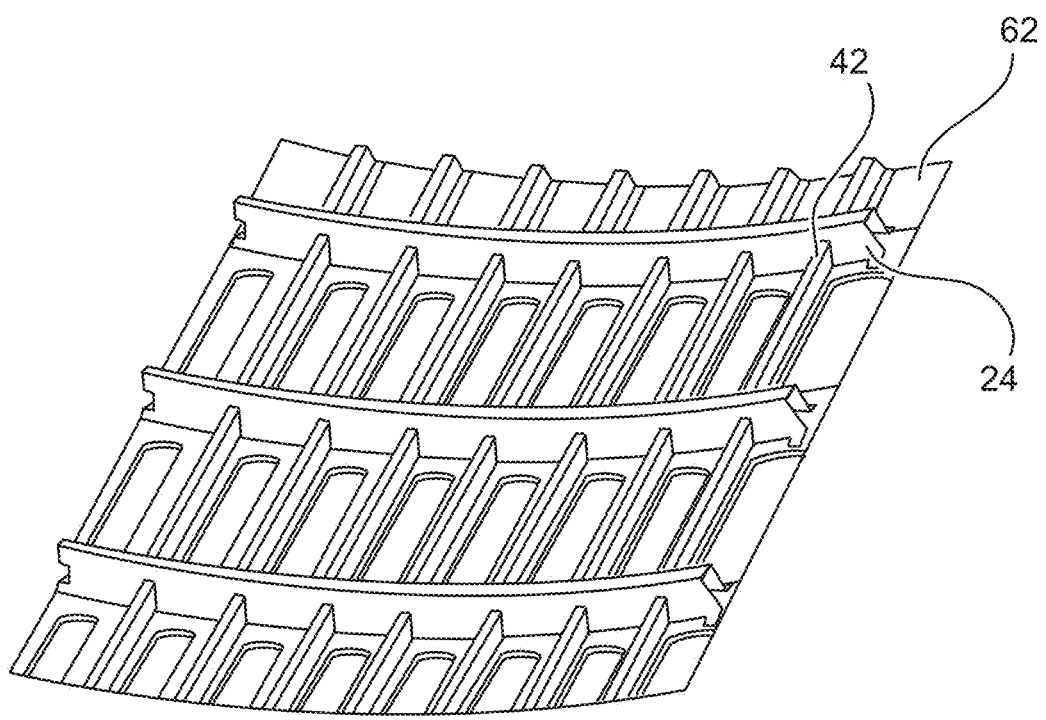
FIG. 2D shows a fuselage wall of an aircraft with stiffening components that are mounted with angle pieces as fiber composite components according to various embodiments.
Figure 3:
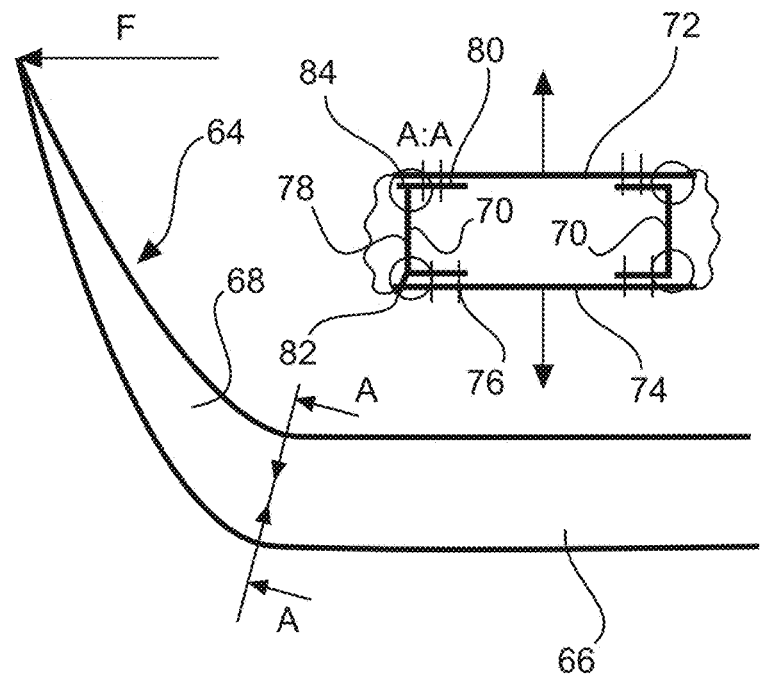
FIG. 3 shows a winglet with a stiffening component and a shell.

FIG. 2D shows the interaction between a fuselage wall 62 comprising a fiber composite material or metallic material, on which fuselage wall 62 reinforcement components 42 are arranged that are attached to the fuselage wall 62 by means of angle pieces 24. Because of the tangentially continuous transitions the introduction of force takes place in a very harmonic manner in all the transition regions, wherein by means of a particularly slight curvature the occurring unfolding stress can be significantly reduced. FIG. 3 shows a winglet 64 that follows on from a wing 66 and comprises an aerodynamically optimized curved shape. The winglet is designed as a hollow body that comprises a shell 68 reinforced with stiffening components 70.

A section view A-A shows that in some sections the winglet 64 is designed as a box-shaped structure comprising an upper covering layer 72 and a lower covering layer 74 that are either designed so as to be separate from each other, or so as to be able to be interconnected to form an integral shell 68. When the winglet 64 is subjected to a force F as shown, the winglet 64 is bent towards the outside so that, due to the resulting shear force, loading of the stiffening components 70 occurs in the interior of the winglet 64. The entire force F or the resulting shear stress is released by way of the stiffening components 70.

As an example, the stiffening components are designed as C-shaped bodies that comprise a first surface section 76, a second surface section 78 and a third surface section 80. The first surface section 76 and the second surface section 78 are arranged at an angle to each other and incorporate a transition region 82, which is designed as shown in FIG. 1B. Likewise, the second surface section 78 and the third surface section 80 enclose a further transition region 84, which is shaped according to the same design principles and comprises two different curvatures. A winglet designed in this manner provides an advantage in that, with the limited design space dictated by the aerodynamic effect, significantly greater forces can be taken up by the stiffening components 70, and in turn more slender winglets 64 would be achievable, or a reduction in the laminate thickness of the surface sections 76, 78 and 80, and thus a reduction in weight would be possible.

For the purpose of mounting the stiffening components 70 on the covering layers 72 and 74 or on the shell 68 fastening means 86 are to be used that extend from the first surface sections 76 to the covering layer 74 and from the third surface sections 80 to the covering layer 72. Said fastening means 86 can be designed as rivets, bolts or other suitable means.

This design principle can also be expanded to cover other bodies that enclose a hollow space, which bodies are subjected to shearing loads or flexural loads. High-lift components, control surfaces, stabilizers, lining elements on aircraft or the like should be mentioned as examples of the above.

Figure 4:
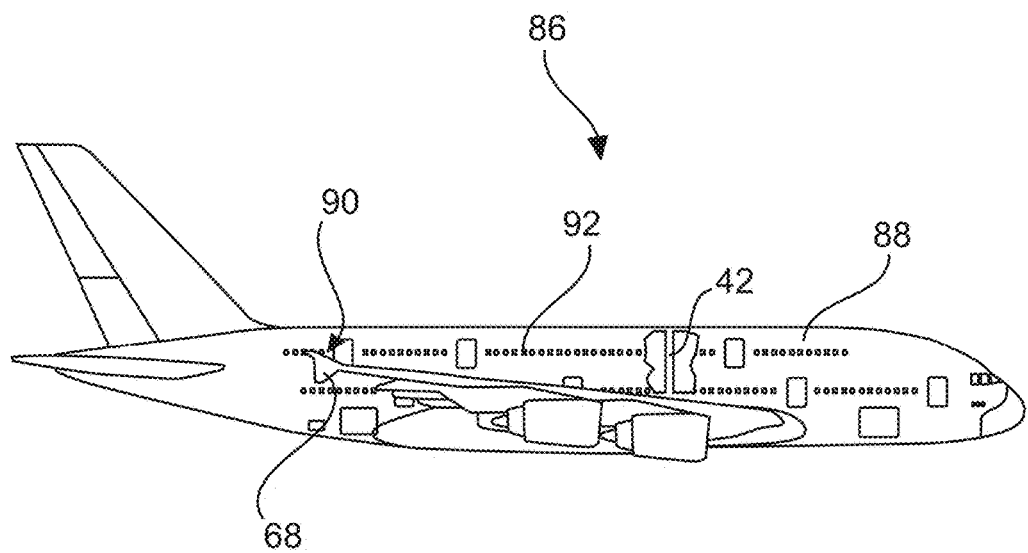
FIG. 4 shows an aircraft with fiber composite components.

FIG. 4 shows an aircraft 86 that comprises a fuselage wall 88 which, as an example, comprises stiffening components 42 that are attached to the fuselage wall 88 by means of angle pieces 24.

According to the illustration of FIG. 3 the winglets 90 comprise a shell 68 which by means of stiffening components 70 is supplemented to form a load-bearing box-like structure. Designing the stiffening components 70 with at least one highly-curved first curvature section 20 and at least one less curved second curvature section 22 results in a clearly improved capacity to bear flexural loads on the structure of the winglet.

Figure 5:
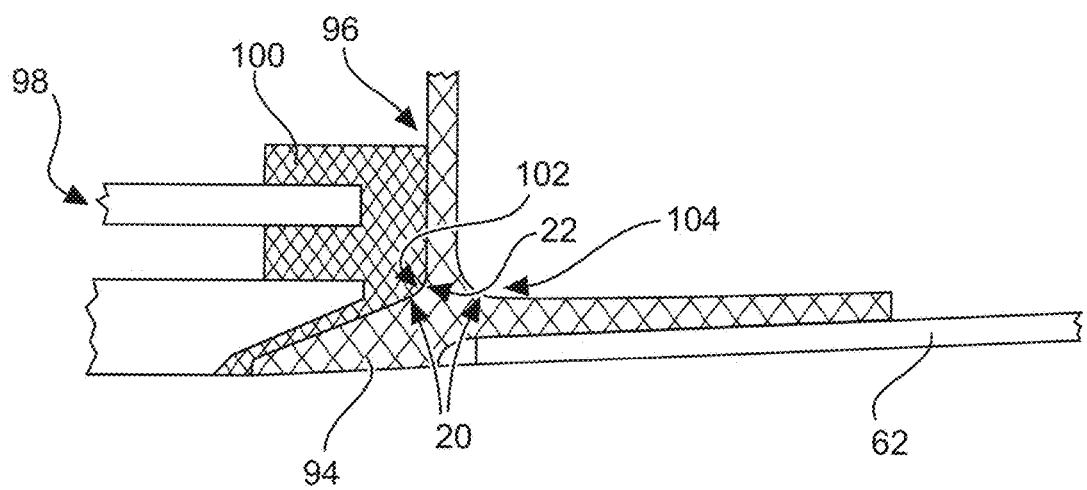
FIG. 5 shows a window frame as a fiber composite component.

Furthermore, aircraft windows 92, shown in more detail in FIG. 5, comprise a window frame 93 which is a fiber composite component with a flange 94 as the first surface section, which can be connected to the wall 62 and in some regions extends into the interior of the aircraft and on a mounting surface 96 as the second surface section makes it possible to receive a pair of window panes 98 and a window seal 100. A transition region 102 between the flange 94, which is connected to the wall 62, and the second surface section 96 comprises a design as shown in FIG. 1B, in which a first curvature section 20 and a second curvature section 22 with significantly different radii are provided. Because of the limitations in the design space, which limitations are guided by conventional window holding devices, the size of the transition region 102 cannot be selected at will, but instead needs to comprise a design, as stated, which design takes account of the expected loads. The same applies to a transition region 104 on the opposite side of the flange 94.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A fiber composite component made of a fiber composite material, comprising:
   at least one first surface section;
   at least one second surface section; and
   at least one transition region that includes a first curvature section having a first constant radius of curvature and a second curvature section having a second constant radius of curvature, wherein the radii of curvature differ from each other, which are curved in the same direction and which connect to each other in a tangentially continuous manner,
   wherein the at least one first surface section and the at least one second surface section are arranged at an angle to each other and enclose the at least one transition region, and the at least one first surface section connects to the at least one transition region, and the at least one transition region connects to the second surface section in each case in a tangentially continuous manner;
   wherein the fiber composite component is a fiber composite stiffening component; and
   wherein the thickness of the transition region is substantially constant.

2. The fiber composite component of claim 1,
   wherein the at least one transition region comprises two first curvature sections that incorporate a second curvature section and the two first curvature sections are connected to the at least one first surface section or the at least one second surface section in a tangentially continuous manner, and
   wherein the mean curvature of the second curvature section is less than the mean curvature of the first curvature sections.

3. The fiber composite component of claim 1,
   wherein the first curvature section comprises a radius of curvature that largely corresponds to the minimum radius of curvature of the fibers used in the fiber composite material.

4. The fiber composite component of claim 1,
   wherein the second curvature section is located at a predetermined location of the fiber composite component.

5. The fiber composite component of claim 4,
   wherein the radius of curvature of the second curvature section is selected in such a manner that at a predetermined laminate thickness of the fiber composite component, the unfolding stress does not exceed a predetermined unfolding stress.

6. The fiber composite component of claim 1,
   wherein the radius of curvature of the second curvature section is at least twice as large as the radius of curvature of the first curvature sections.

7. The fiber composite component of claim 1,
   wherein the radius of curvature of the second curvature section is at least five times as large as the radius of curvature of the first curvature sections.

8. The fiber composite component of claim 1,
   wherein the radius of curvature of the second curvature section is at least ten times as large as the radius of curvature of the first curvature sections.

9. The fiber composite component of claim 1, wherein the fiber composite component is an angle piece with at least one fastening means on a first surface section and at least one fastening means on a second surface section.

10. The fiber composite component of claim 1, wherein the fiber composite component is a window frame for a vehicle.

11. The fiber composite component of claim 1, wherein the fiber composite component is a stiffening component for a vehicle body.

12. A winglet, comprising:
    a shell; and
    a stiffening component as a fiber composite component, the fiber composite component including:
    a first surface section;
    a second surface section; and
    a transition region that includes a first curvature section having a first constant radius of curvature and a second curvature section having a second constant radius of curvature,
    the thickness of the transition region being substantially constant,
    wherein the radii of curvature differ from each other, which are curved in the same direction and which connect to each other in a tangentially continuous manner,
    wherein the first surface section and the second surface section are arranged at an angle to each other and enclose the transition region, and the first surface section connects to the transition region, and the transition region connects to the second surface section in each case in a tangentially continuous manner.

13. An aircraft, comprising:
    a fiber composite stiffening component including:
    a first surface section;
    a second surface section;
    a transition region that includes a first curvature section having a first constant radius of curvature and a second curvature section having a second constant radius of curvature, wherein the radii of curvature differ from each other, which are curved in the same direction and which connect to each other in a tangentially continuous manner,
    wherein the thickness of the transition region is substantially constant, and wherein the first surface section and the second surface section are arranged at an angle to each other and enclose the transition region, the first surface section connects to the transition region, and the transition region connects to the second surface section in each case in a tangentially continuous manner, and the first radius of curvature section largely corresponds to the minimum radius of curvature of the fibers used in the fiber composite material.

14. The aircraft of claim 13, comprising a winglet, the winglet including a shell and a stiffening component, wherein the fiber composite component is the stiffening component.

15. The aircraft of claim 13,
wherein the radius of curvature of the second curvature section is at least twice as large as the radius of curvature of the first curvature section.

16. The aircraft of claim 13,
wherein the radius of curvature of the second curvature section is at least five times as large as the radius of curvature of the first curvature section.

17. The aircraft of claim 13,
wherein the radius of curvature of the second curvature section is at least ten times as large as the radius of curvature of the first curvature section.

18. The aircraft of claim 13, wherein the fiber composite component is an angle piece with at least one fastening means on a first surface section and at least one fastening means on a second surface section.

19. The aircraft of claim 13, wherein the fiber composite component is a window frame for the aircraft.

20. The aircraft of claim 13, wherein the fiber composite component is a stiffening component for a fuselage of the aircraft.

* * * * *